United States Patent
Huang et al.

(10) Patent No.: US 9,456,262 B2
(45) Date of Patent: Sep. 27, 2016

(54) DISPLAY DEVICE WITH A DETACHABLE SPEAKER MODULE

(71) Applicant: Wistron Corporation, New Taipei (TW)

(72) Inventors: Guo-Wei Huang, New Taipei (TW); Ho-Tang Chiang, New Taipei (TW); Shu-hua Dai, New Taipei (TW); Liang Yang, New Taipei (TW); Ji-Lian Su, New Taipei (TW)

(73) Assignee: Wistron Corporation, New Taipei (TW)

( * ) Notice: Subject to any disclaimer, the term of this patent is extended or adjusted under 35 U.S.C. 154(b) by 30 days.

(21) Appl. No.: 14/686,786

(22) Filed: Apr. 15, 2015

(65) Prior Publication Data

US 2016/0143160 A1 May 19, 2016

(30) Foreign Application Priority Data

Nov. 18, 2014 (CN) .......................... 2014 1 0658548

(51) Int. Cl.
*H04R 1/02* (2006.01)
*G06F 1/16* (2006.01)
*H04N 5/64* (2006.01)
*F16M 11/22* (2006.01)

(52) U.S. Cl.
CPC .............. *H04R 1/028* (2013.01); *F16M 11/22* (2013.01); *G06F 1/16* (2013.01); *H04N 5/642* (2013.01); *F16M 2200/08* (2013.01); *H04R 2499/15* (2013.01)

(58) Field of Classification Search
CPC ............. H05K 5/0017; H05K 5/0247; H05K 5/0234; H05K 7/10; H04R 1/028; H04R 2499/15
See application file for complete search history.

(56) References Cited

U.S. PATENT DOCUMENTS 8,325,966 B2 * 12/2012 Huang ..................... H04R 5/02
381/386
2008/0087790 A1 * 4/2008 Tseng .................... F16M 11/26
248/624

FOREIGN PATENT DOCUMENTS

TW 201218780 5/2012

OTHER PUBLICATIONS

Office action mailed on Aug. 3, 2015 for the Taiwan application No. 103142444, filing date: Dec. 5, 2014, p. 1 line 10-14, p. 2-4 and p. 5 line 1-6.

* cited by examiner

*Primary Examiner* — Brian Ensey
(74) *Attorney, Agent, or Firm* — Winston Hsu; Scott Margo

(57) ABSTRACT

A display device includes a monitor, a stand, and a speaker module. The monitor includes a first side and a second side. An accommodating groove is formed on the first side, and a slot is formed on the second side. The stand is selectively installed inside the accommodating groove for being stored in the first side of the monitor or inserted into the slot for supporting the monitor on a supporting surface. The speaker module is installed inside the stand for outputting an audio signal transmitted from the monitor.

11 Claims, 10 Drawing Sheets

DISPLAY DEVICE WITH A DETACHABLE SPEAKER MODULE

BACKGROUND OF THE INVENTION

1. Field of the Invention

The present invention relates to a display device, and more particularly, to a display device with a detachable speaker module.

2. Description of the Prior Art

Televisions are indispensable home appliances in people's lives. With the advancement of technology, requirements of outward appearances, displaying effects, and intelligence of televisions are increasing. Furthermore, in order to satisfy the requirement of outward appearance, manufacturers produce a series of thin and light televisions with narrow frames, even without frames. As televisions become thinner and slimmer, mechanical space inside televisions is restrained. However, speaker modules of the conventional televisions are designed inside or at two sides of the televisions, which conflicts with the trend of thinness and slimness of televisions. Meanwhile, due to limited internal mechanical space, there is no enough space to accommodate speaker modules, which reduces sound quality. Therefore, it has become a topic in the field to design a thin and light display device with good sound quality.

SUMMARY OF THE INVENTION

In order to resolve the above-mentioned drawbacks, the present invention aims at providing a display device with a detachable speaker module.

According to the claimed invention, a display device includes a monitor, a stand, and a speaker module. The monitor includes a first side and a second side. An accommodating groove is formed on the first side, and a slot is formed on the second side. The stand is selectively installed inside the accommodating groove for being stored in the first side of the monitor, or inserted into the slot for supporting the monitor on a supporting surface. The speaker module is installed inside the stand for outputting an audio signal transmitted from the monitor.

According to the claimed invention, the stand includes a base and a supporting frame. The base is for accommodating the speaker module. The supporting frame includes a first end and a second end. The first end is detachably connected to the base, and the second end is inserted into the slot.

According to the claimed invention, the display device further includes a fixing member for fixing the supporting frame on the monitor.

According to the claimed invention, a shape of the accommodating groove of the monitor is corresponding to a shape of the base. The base is formed in a V shape, and the accommodating groove is formed in a V shape.

According to the claimed invention, the display device further includes a bridging member for connecting the base to the first side of the monitor, so as to fix the base inside the accommodating groove.

According to the claimed invention, an audio socket is disposed on the base and electrically connected to the speaker module. An audio plug is disposed in the accommodating groove, and the audio plug is inserted into the audio socket when the base is installed in the accommodation groove, so as to electrically connect the monitor and the speaker module.

According to the claimed invention, two metal conductive members are respectively disposed at the first end and the second end of the supporting frame. A connecting terminal is disposed in the slot, and the connecting terminal is connected to the metal conductive member at the second end of the supporting frame when the supporting frame is inserted into the slot of the monitor, so as to electrically connect the monitor and the speaker module.

According to the claimed invention, the display device further includes an electrode connecting member and an elastic member. The electrode connecting member is electrically connected to the speaker module. The elastic member is connected to the electrode connecting member. The elastic member drives the electrode connecting member to contact with the metal conductive member at the first end of the supporting frame when the supporting frame is inserted into the slot of the monitor.

According to the claimed invention, an opening is further formed on the first side of the monitor for accommodating the supporting frame.

According to the claimed invention, at least one sound hole is formed on the base and located at a position corresponding to the speaker module.

According to the claimed invention, the first side of the monitor is substantially perpendicular to the second side of the monitor.

In summary, the present invention provides the display device with the detachable speaker module. The speaker module is installed inside the stand. The stand is selectively installed in the accommodating groove of the monitor, such that the display device is configured to be in the wall-mounting status, or the stand is inserted into the slot of the monitor for supporting the monitor on a supporting surface, such that the display device is configured to be in the standing status. The speaker module is electrically connected to the monitor in the wall-mounting status or the standing status, so as to enhance the sound quality, which solves the problem of poor sound quality due to the conventional speak module installed in limited internal mechanical space inside the display device in the prior art.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
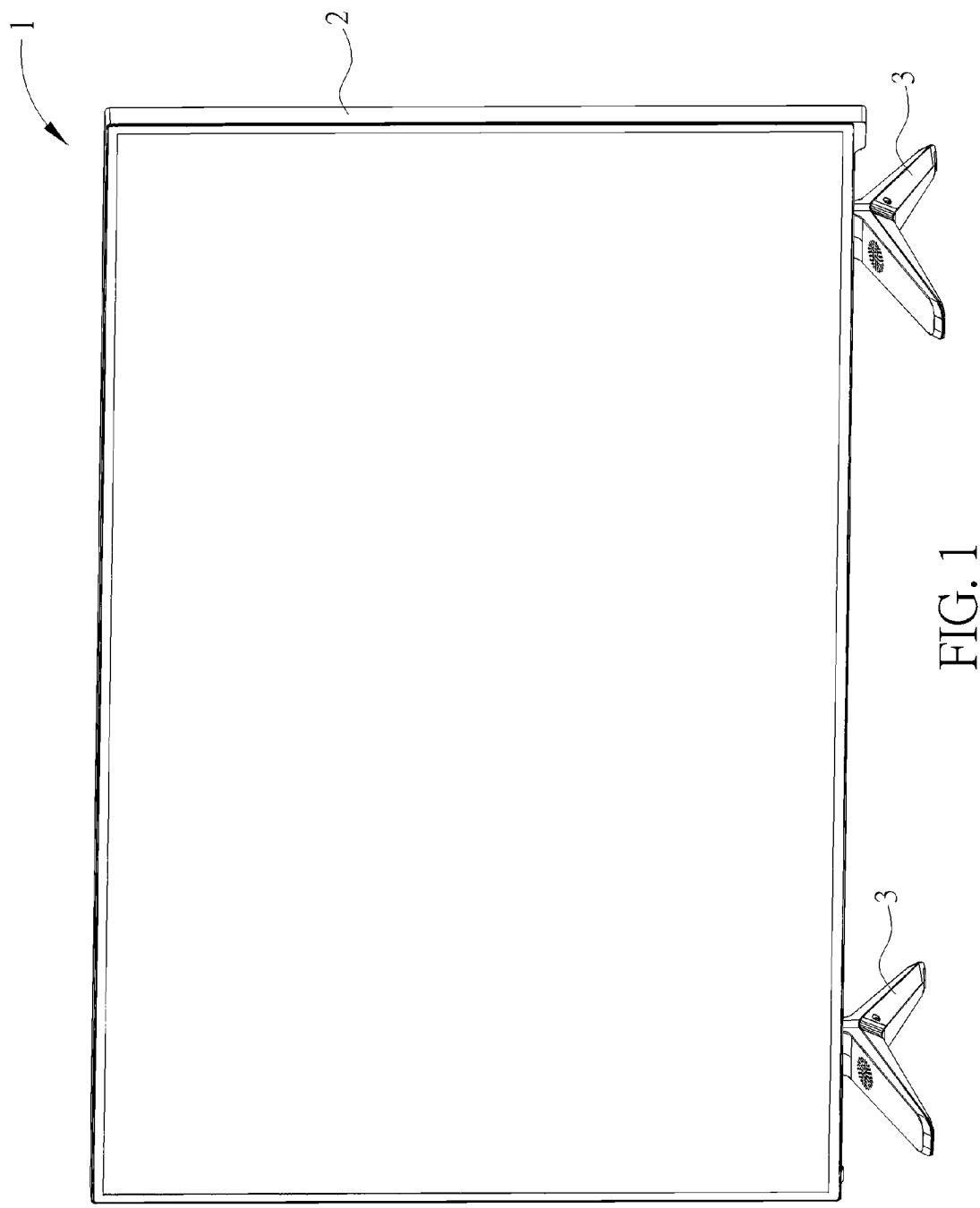
FIG. 1 to FIG. 3 are schematic diagrams of a display device at different views and in different statuses according to an embodiment of the present invention.
Figure 2:
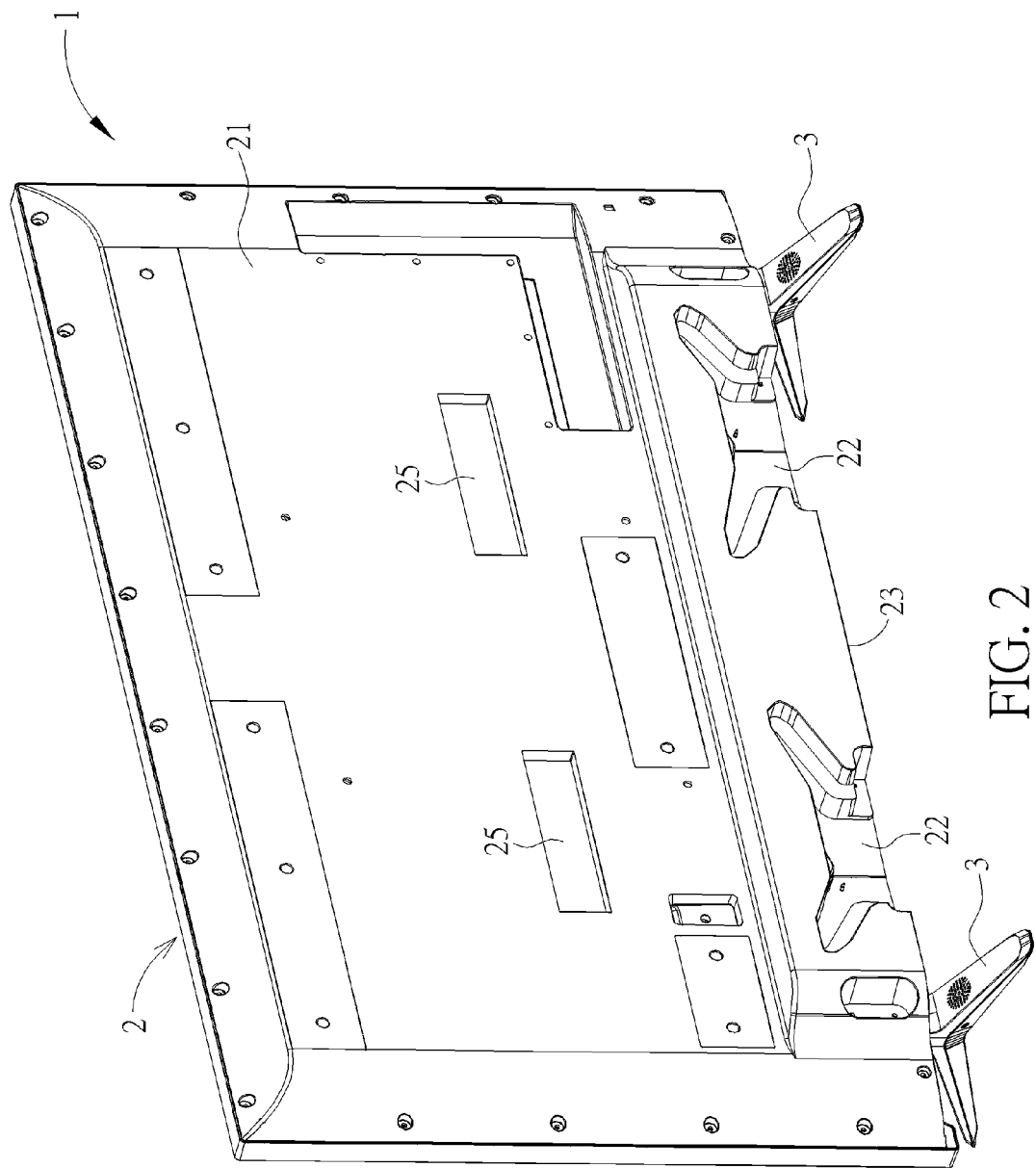
Figure 3:
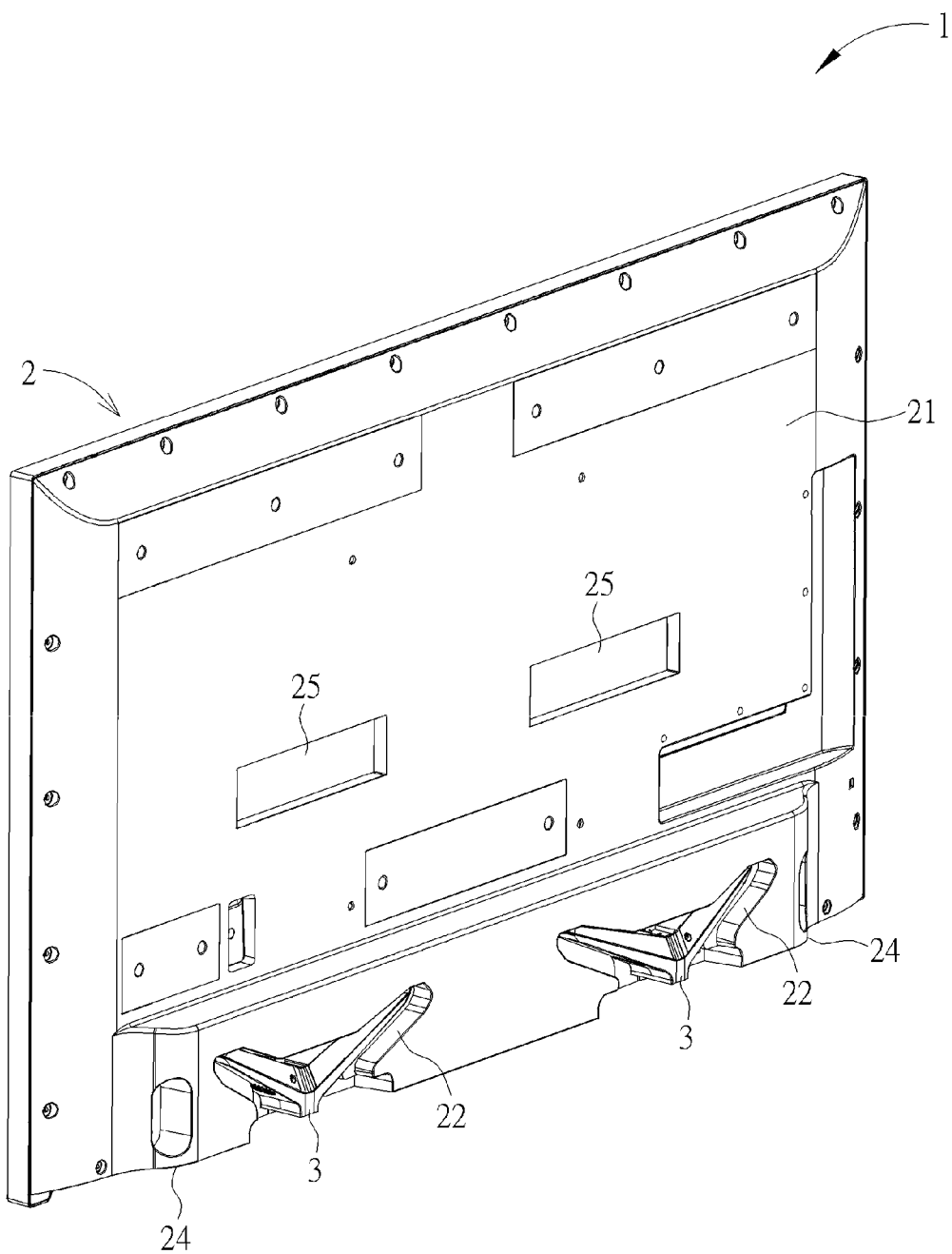

Please refer to FIG. 1 to FIG. 3. FIG. 1 to FIG. 3 are schematic diagrams of a display device 1 at different views and in different statuses according to an embodiment of the present invention. The display device 1 includes a monitor 2 and at least one stand 3. At least one accommodating groove 22 is formed on a first side 21 of the monitor 2. At least one slot 24 is formed on a second side 23 of the monitor 2. In this embodiment, the first side 21 and the second side 23 of the monitor 2 are a rear side and a bottom side respectively, and the rear side is substantially perpendicular to the bottom side. However, the accommodating groove 22 and the slot 24 can be, but not limited to, disposed at the rear side and the bottom side. It depends on practical demands. As shown in FIG. 3, the stand 3 is selectively installed inside the accommodating groove 22 of the monitor 2 for being stored in the first side 21 of the monitor 2, as shown in FIG. 3, or inserted into the slot 24 of the monitor 2 for supporting the monitor 2 on a supporting surface. In this embodiment, the present invention includes two accommodating grooves 22, two slots 24, and two stands 3. However, the numbers of the accommodating 22, the slot 24, and the stand 3 are not limited to this embodiment, and it depends on practical demands.

Figure 4:
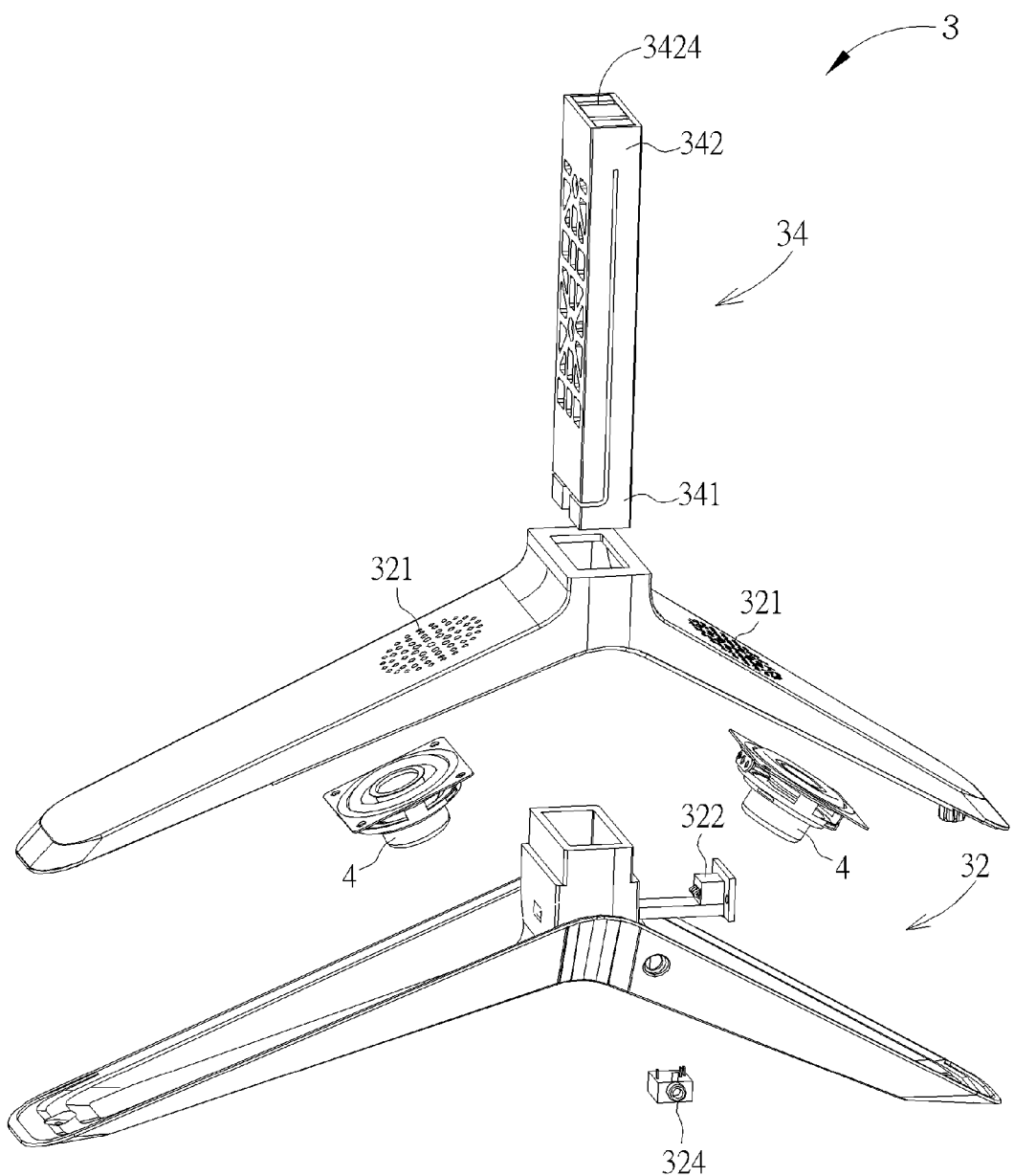
FIG. 4 is an exploded diagram of a stand according to the embodiment of the present invention.
Figure 5:
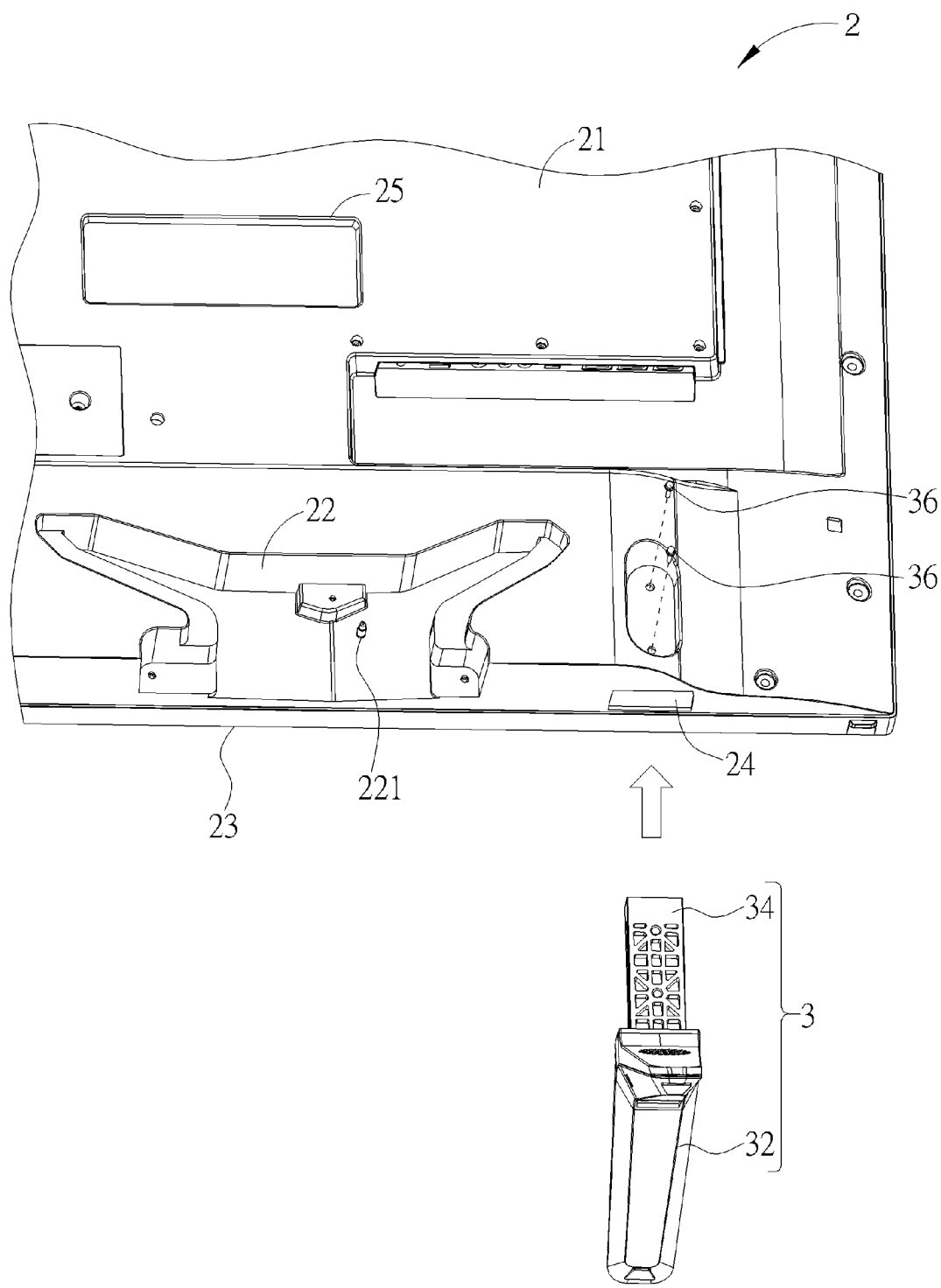
FIG. 5 is a diagram illustrating that the stand is to be inserted into a slot of a monitor according to the embodiment of the present invention.
Figure 6:
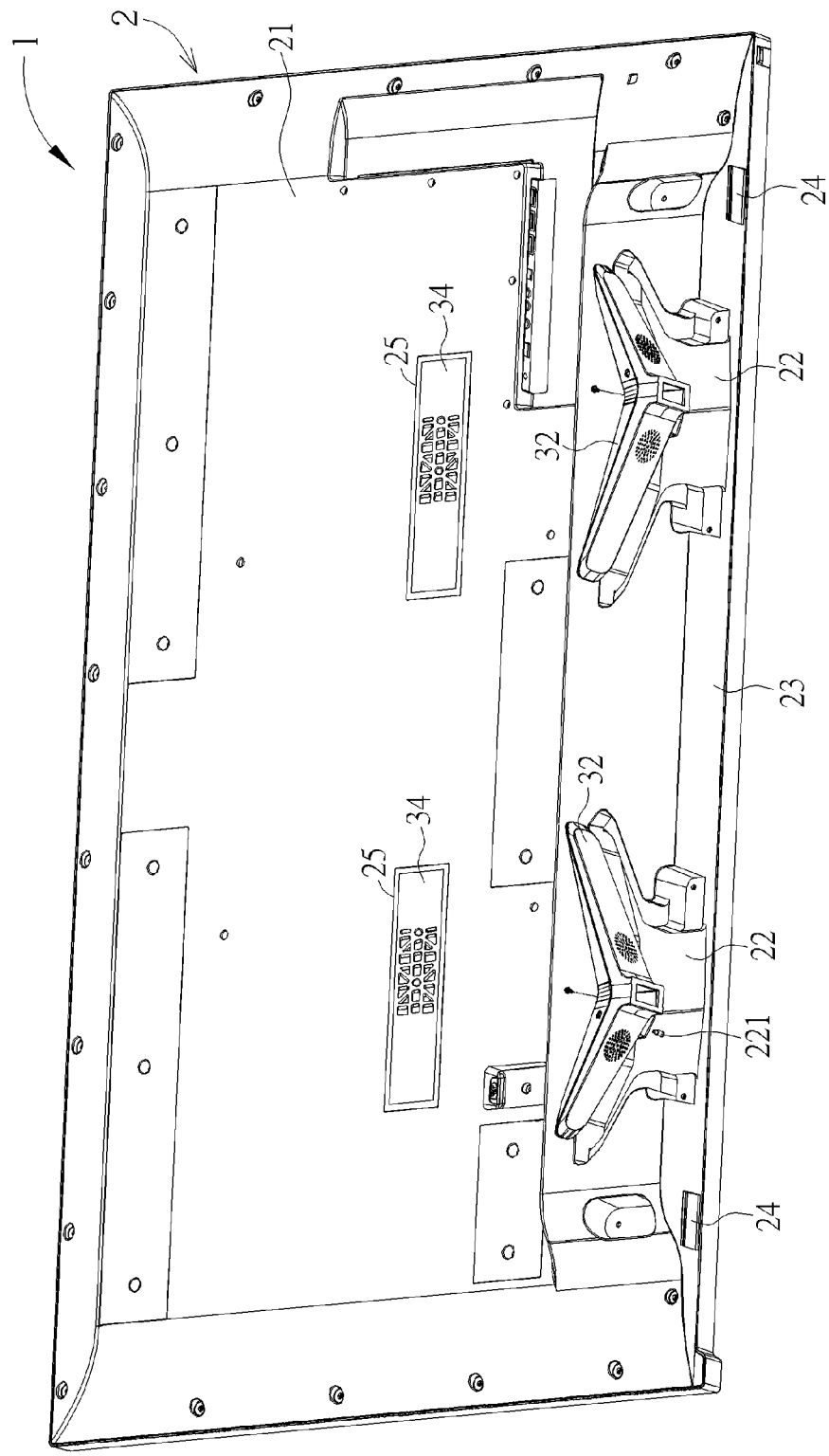
FIG. 6 is a diagram illustrating that the stand is to be accommodated inside an accommodating groove of the monitor according to the embodiment of the present invention.
Figure 7:
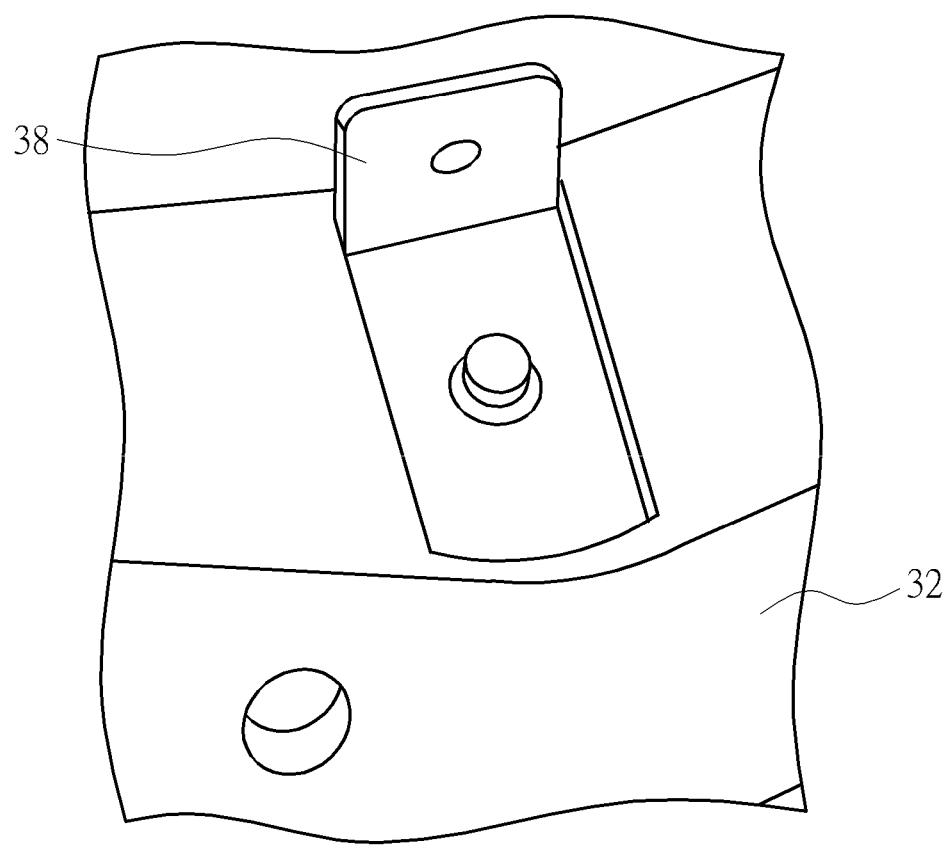
FIG. 7 and FIG. 8 are diagrams of a bridging member for fixing the stand on the accommodating groove of the monitor at different views according to the embodiment of the present invention.
Figure 8:
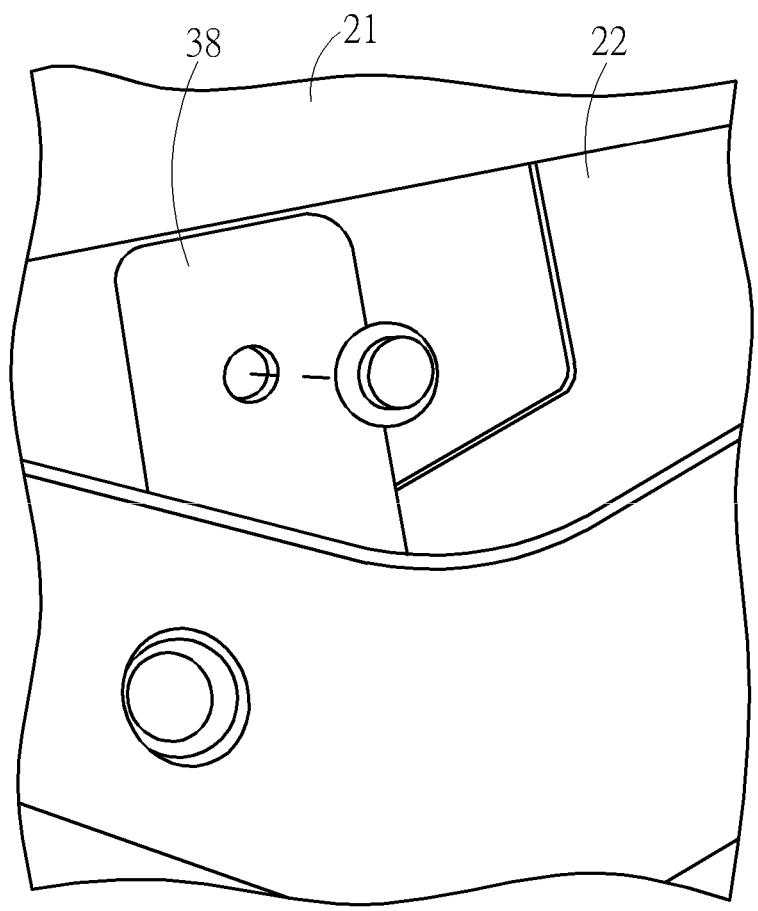

Please refer to FIG. 4 to FIG. 8. FIG. 4 is an exploded diagram of the stand 3 according to the embodiment of the present invention. FIG. 5 is a diagram illustrating that the stand 3 is to be inserted into a slot 24 of the monitor 2 according to the embodiment of the present invention. FIG. 6 is a diagram illustrating that the stand 3 is to be accommodated inside the accommodating groove 22 of the monitor 2 according to the embodiment of the present invention. FIG. 7 and FIG. 8 are diagrams of a bridging member 38 for fixing the stand 3 on the accommodating groove 22 of the monitor 2 at different views according to the embodiment of the present invention. As shown in FIG. 4, the display device 1 further includes at least one speaker module 4 installed inside the stand 3. The speaker module 4 is for outputting an audio signal transmitted from the monitor 2. The stand 3 includes a base 32 and a supporting frame 34. The base 32 is for accommodating the speaker module 4. At least one sound hole 321 is formed on the base 32 and located at a position corresponding to the speaker module 4, such that sound generated by the speaker module 4 is transmitted out of the base 32 through the sound hole 321. A first end 341 of the supporting frame 34 is detachably connected to the base 32. A second end 342 of the supporting frame 34 is to be inserted into the slot 22 of the monitor 2. As shown in FIG. 5, the display device 1 further includes at least one fixing member 36. The fixing member 36 is for fixing the supporting frame 34 on the monitor 2 when the supporting frame 34 is inserted into the slot 24 of the monitor 2. The fixing member 36 can be a screw member.

When it is desired to put the display device 1 on a supporting surface, such as a desktop, the first end 341 of the supporting frame 34 is connected to the base 32 of the stand 3, and the second end 342 of the supporting frame 34 is inserted into the slot 24 of the monitor 2. The supporting frame 34 is fixed on the monitor 2 by the fixing member 36. Furthermore, as shown in FIG. 6 to FIG. 8, the display device 1 further includes a bridging member 38 for connecting the base 32 and the first side 21 of the monitor 2, so as to fix the base 32 inside the accommodating groove 22. The bridging member 38 can be an L-shaped member. A side of the L-shaped member is fixed on a bottom surface of the base 32, and the other side of the L-shaped member is fixed on a side wall of the accommodating groove 22. In other words, when the display device 1 is desired to be mounted on a wall, the first end 341 of the supporting frame 34 is detached from the base 32 of the stand 3, and then the base 32 is installed in the accommodating groove 22. The base 32 is fixed on the accommodating groove 22 by the bridging member 38. In this embodiment, the base 32 can be a V-shaped base, and the accommodating groove 22 of the monitor 2 can be a V-shaped accommodating groove accordingly. A shape of the accommodating groove 22 is corresponding to a shape of the base 32. However, it is not limited to this embodiment. Furthermore, at least one opening 25 is further formed on the first side 21 of the monitor 2 for accommodating the supporting frame 34 detached from the base 32.

Figure 9:
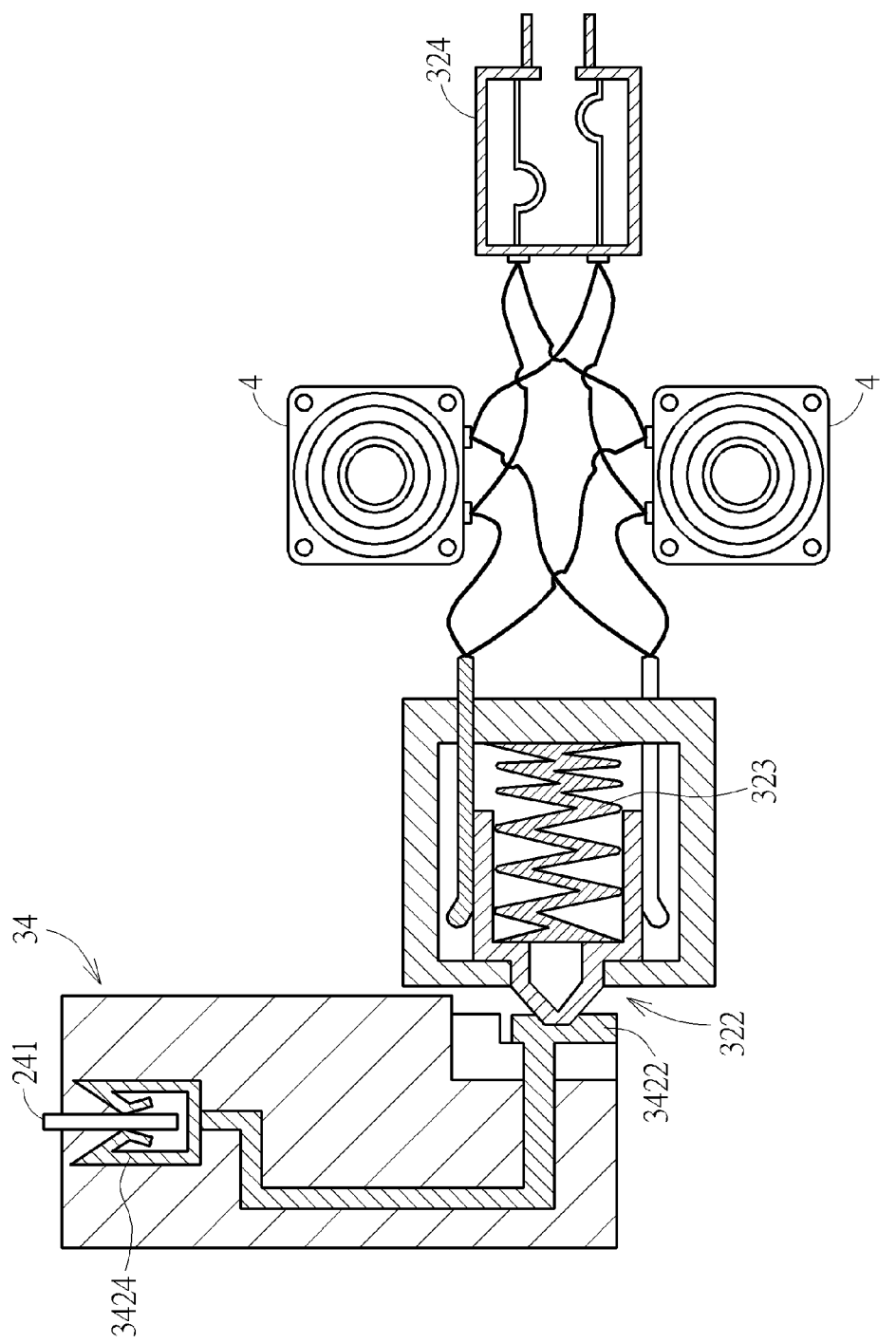
FIG. 9 is an electrical connection diagram as the stand is inserted into the slot of the monitor according to the embodiment of the present invention.
Figure 10:
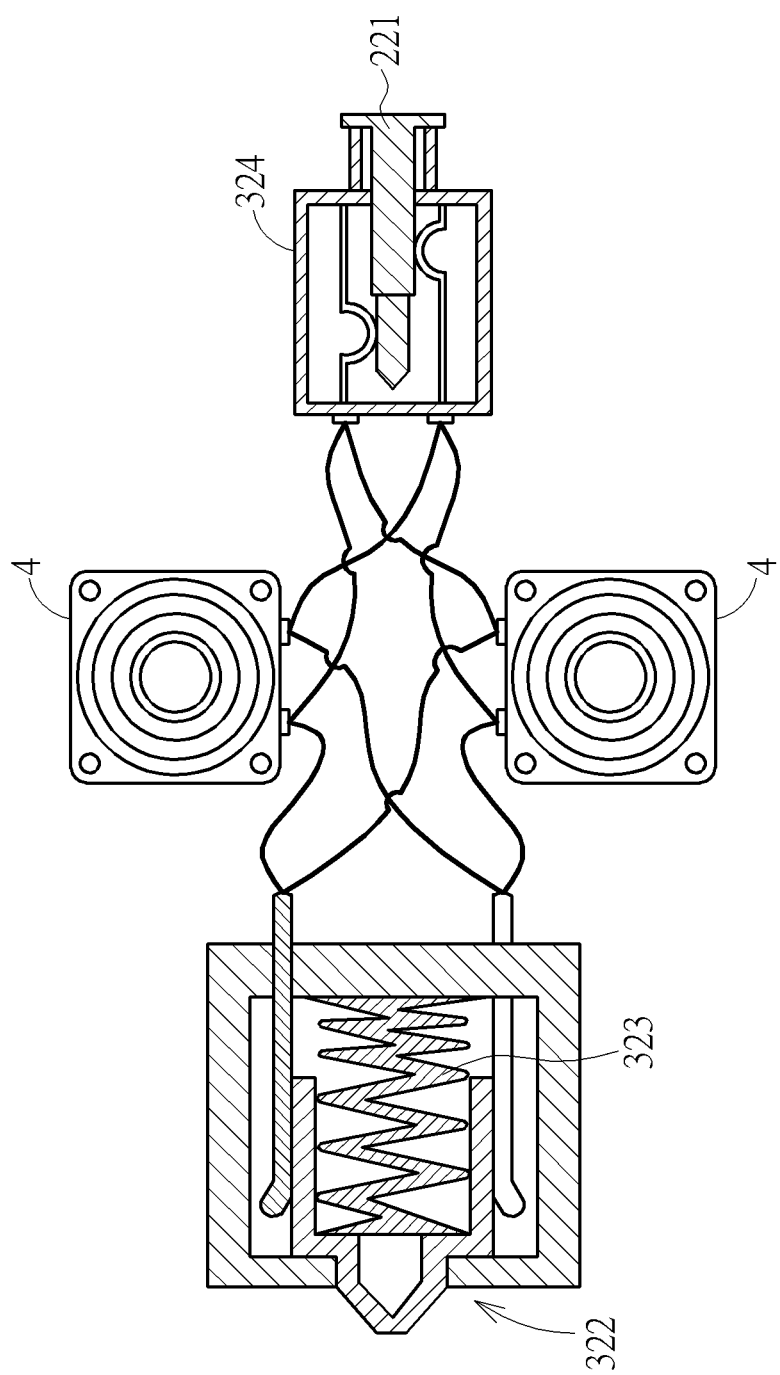
FIG. 10 is an electrical connection diagram as the stand is accommodated inside the accommodating groove of the monitor according to the embodiment of the present invention.

The operating principle of electrical connection of the speaker module 4 and the monitor 2 is described as follows. Please refer to FIG. 4 to FIG. 6, FIG. 9, and FIG. 10. FIG. 9 is an electrical connection diagram as the stand 3 is inserted into the slot 24 of the monitor 2 according to the embodiment of the present invention. FIG. 10 is an electrical connection diagram as the stand 32 is accommodated inside the accommodating groove 22 of the monitor 2 according to the embodiment of the present invention. Two metal conductive members 3422, 3424 are respectively disposed at the first end 341 and the second end 342 of the supporting frame 34. The metal conductive members 3422, 3424 are electrically connected to each other. A connecting terminal 241 is disposed in the slot 24 of the monitor 2 and connected to the metal conductive member 3424 at the second end 342 of the supporting frame 34 when the supporting frame 34 is inserted into the slot 24 of the monitor 2. The base 32 further includes an electrode connecting member 322, an elastic member 323, and an audio socket 324. The electrode connecting member 322 is electrically connected to the speaker module 4. The elastic member 323 is connected to the electrode connecting member 322 and drives the electrode connecting member 322 to contact with the metal conductive member 3422 at the first end 341 of the supporting frame 34 when the supporting frame 34 is inserted into the slot 24 of the monitor 2, so as to electrically connect the monitor 2 and the speaker module 4. Furthermore, the audio socket 324 is electrically connected to the speaker module 4. An audio plug 221 is disposed in the accommodating groove 22 of the monitor 2. The audio plug 221 is inserted into the audio socket 324 when the base 32 is installed in the accommodation groove 22, so as to electrically connect the monitor 2 and the speaker module 4.

In summary, when the display device 1 is placed on the supporting surface and in a standing status, the first end 341 of the supporting frame 34 is connected to the base 32, and the second end 342 of the frame 34 is inserted into the slot 24 of the monitor 2. As shown in FIG. 9, the connecting terminal 241 in the slot 24 of the monitor 2 contacts with the metal conductive member 3424 at the second end 342 of the supporting frame 34, and the elastic member 323 in the base 32 drives the electrode connecting member 322 to contact with the metal conductive member 3422 at the first end 341 of the supporting frame 34, so as to electrically connect the monitor 2 and the speaker module 4. In such a way, the speaker module 4 can output an audio signal transmitted from the monitor 2. On the other hand, when the display device 1 is in a wall mounting status, the supporting frame 34 is detached from the base 32, and the base 32 is stored in the accommodating groove 22 of the monitor 2. As shown in FIG. 10, the audio plug 221 in the accommodating groove 22 of the monitor 2 is inserted into the audio socket 324 of the base 32, so as to electrically connect the monitor 2 and the speaker module 4. In such a way, the speaker module 4 also can output an audio signal transmitted from the monitor 2. It should be noticed that the base 32 also can be connected to another multimedia player, such as a smartphone or a tablet computer through the audio socket 324, so as to be a peripheral device to output an audio signal transmitted from the multimedia player.

In contrast to the prior art, the present invention provides the display device with the detachable speaker module. The speaker module is installed inside the stand. The stand is selectively installed in the accommodating groove of the monitor, such that the display device is configured to be in the wall-mounting status, or the stand is inserted into the slot of the monitor for supporting the monitor on a supporting surface, such that the display device is configured to be in the standing status. The speaker module is electrically connected to the monitor in the wall-mounting status or the standing status, so as to enhance the sound quality, which solves the problem of poor sound quality due to the conventional speak module installed in limited internal mechanical space inside the display device in the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display device comprising:
   a monitor comprising a first side and a second side, an accommodating groove being formed on the first side, and a slot being formed on the second side;
   a stand selectively installed inside the accommodating groove for being stored in the first side of the monitor, or inserted into the slot for supporting the monitor on a supporting surface, the stand comprising:
   a base for accommodating the speaker module; and
   a supporting frame comprising a first end and a second end, the first end being detachably connected to the base, and the second end being inserted into the slot; and
   a speaker module installed inside the stand for outputting an audio signal transmitted from the monitor;
   wherein two metal conductive members are respectively disposed at the first end and the second end of the supporting frame, a connecting terminal is disposed in the slot, and the connecting terminal is connected to the metal conductive member at the second end of the supporting frame when the supporting frame is inserted into the slot of the monitor, so as to electrically connect the monitor and the speaker module.

2. The display device of claim 1, further comprising a fixing member for fixing the supporting frame on the monitor.

3. The display device of claim 2, wherein a shape of the accommodating groove of the monitor is corresponding to a shape of the base, the base is formed in a V shape, and the accommodating groove is formed in a V shape.

4. The display device of claim 1, further comprising a bridging member for connecting the base to the first side of the monitor, so as to fix the base inside the accommodating groove.

5. The display device of claim 4, wherein a shape of the accommodating groove of the monitor is corresponding to a shape of the base, the base is formed in a V shape, and the accommodating groove is formed in a V shape.

6. The display device of claim 1, wherein a shape of the accommodating groove of the monitor is corresponding to a shape of the base, the base is formed in a V shape, and the accommodating groove is formed in a V shape.

7. The display device of claim 1, wherein an audio socket is disposed on the base and electrically connected to the speaker module, an audio plug is disposed in the accommodating groove, and the audio plug is inserted into the audio socket when the base is installed in the accommodation groove, so as to electrically connect the monitor and the speaker module.

8. The display device of claim 1, further comprising:
   an electrode connecting member electrically connected to the speaker module; and
   an elastic member connected to the electrode connecting member, the elastic member driving the electrode connecting member to contact with the metal conductive member at the first end of the supporting frame when the supporting frame is inserted into the slot of the monitor.

9. The display device of claim 1, wherein an opening is further formed on the first side of the monitor for accommodating the supporting frame.

10. The display device of claim 1, wherein at least one sound hole is formed on the base and located at a position corresponding to the speaker module.

11. The display device of claim 1, wherein the first side of the monitor is substantially perpendicular to the second side of the monitor.

* * * * *